US005392621A

United States Patent [19]

Dunnigan

[11] Patent Number: 5,392,621

[45] Date of Patent: Feb. 28, 1995

[54] PROTECTIVE SHIELD FOR OUT DRIVE OF A VESSEL

[76] Inventor: Patrick J. Dunnigan, 10314 SW. 128th Ct., Miami, Fla. 33186

[21] Appl. No.: 85,552

[22] Filed: Jun. 30, 1993

[51] Int. Cl.[6] .......... F16B 41/00

[52] U.S. Cl. .......... 70/232; 70/14; 70/57; 70/58

[58] Field of Search .......... 70/14, 57, 58, 18, 232, 70/229, 230, DIG. 34, 158, 163, 164, 171, 172, 258; 440/900, 101, 113

[56] References Cited

U.S. PATENT DOCUMENTS

| | | | |
|---|---|---|---|
| 2,592,772 | 4/1952 | Wardius | 70/58 |
| 2,598,610 | 5/1952 | Satz et al. | 292/288 |
| 2,785,563 | 3/1957 | Strollis | 70/58 |
| 2,912,847 | 11/1959 | Putman et al. | 70/58 |
| 3,002,488 | 10/1961 | Guhlin | 440/113 |
| 3,581,700 | 6/1971 | Storch | 440/900 |
| 3,650,130 | 3/1972 | Thompson | 70/58 |
| 3,893,312 | 7/1975 | Johnson | 70/58 |
| 4,257,247 | 3/1981 | Sims | 70/232 |
| 4,325,701 | 4/1982 | Peters, II et al. | 70/232 |
| 4,475,366 | 10/1984 | Marneris | 70/57 |
| 4,502,306 | 3/1985 | Scammacca | 70/163 |
| 4,557,458 | 12/1985 | Vahlberg et al. | 70/58 |
| 4,648,254 | 3/1987 | Bloemers | 70/232 |
| 4,658,607 | 4/1987 | Muse, Jr. et al. | 70/232 |
| 4,715,783 | 12/1987 | Wade | 70/232 |
| 4,736,603 | 4/1988 | Brushaber | 70/232 |
| 4,777,809 | 10/1988 | Wiggins | 70/14 |
| 4,979,381 | 12/1990 | Luongo | 70/57 |
| 5,184,488 | 2/1993 | Sandlin | 70/14 |

*Primary Examiner*—Peter M. Cuomo
*Assistant Examiner*—Darnell M. Boucher
*Attorney, Agent, or Firm*—Malloy & Malloy

[57] ABSTRACT

The invention relates to a protective shield for a vessel having an engine with a transmission portion extending exteriorly of the vessel. The protective shield is designed to be positioned about the interconnection of the out drive and the transmission portion when the out drive is in an elevated position and effective to block access to the fasteners which secure the out drive to the transmission. The protective shield has a pair of spaced side walls converging downwardly and away from a rear wall and each side wall has a hole therethrough to accept a locking pin. The shield deters removal of the out drive by unauthorized persons.

6 Claims, 2 Drawing Sheets

PROTECTIVE SHIELD FOR OUT DRIVE OF A VESSEL

BACKGROUND OF THE INVENTION

FIELD OF THE INVENTION

This invention is of a protective shield for a vessel having an engine with a transmission means having a portion extending exteriorly of the vessel, the protective shield being adapted to be positioned about .the interconnection of the out drive and the transmission means.

SUMMARY OF THE INVENTION

In the past, there has long been a problem of theft of out drives of vessels equipped with an inboard engine and a transmission means with a portion extending exteriorly of the vessel. Conventionally, the exteriorly extending portion of the transmission means includes an outboard bell housing. An out drive is secured by bolts to the bell housing. All that is required to quickly "snatch" an out drive is the removal of six bolts which conventionally fasten an out drive to the bell housing of the boat. Without protection, an out drive can be removed from a bell housing by simply removing those six bolts which requires in the order of about three to five minutes. Since out drives are relatively expensive, replacement cost being in the range of $2,000.00 to $3,000.00, it is important that the number of this type of quick "snatch" theft be reduced.

It is estimated that there are currently 50,000 thefts annually; and the attendant expense is apparent testifying to the need for such a device.

This invention is of a shield which protectively prohibits access to the bolts. The protective shield of the instant invention is adapted to be quickly and readily installed to protectively shield access to the bolts which secure an out drive to a bell housing, thereby deterring theft of the out drive.

The art is replete with numerous efforts by others to resolve this problem such as is exemplified by the patent to Brushaber, U.S. Pat. No. 4,736,603 which attempts to solve the problem by providing locks on each of the respective exteriorly accessible six bolts. Another representative effort to solve the problem is found in U.S. Pat. No. 4,502,306, which teaches a locking device for the out drive of a boat which completely enshrouds the stern of a vessel. Another representative patent is U.S. Pat. No. 4,325,701, dated Apr. 20, 1982 and issued to James K. Peters, II for a protective device which is in the form of a shield which includes an upper portion which cooperates with a replacement part for an engine. In this invention, the upper portion of the out drive, or its cap, must be removed, and replaced by a different cap having a protrusion with an eye to accommodate a padlock.

The present invention is of a device which is not invasive of the existing outboard structure but which, rather, is positioned about it, shielding the bolts so that access cannot be obtained to them without substantial difficulty thereby deterring a quick "snatch" of an out drive. Thus, a person who has his boat in a side yard or driveway, is not in fear that the out drive can be snatched readily by a thief.

This protective shield is particularly designed to be used in connection with the Alpha One Merc Cruiser out drive manufactured by Merc Cruiser Marine Company of Wisconsin. This popular out drive is characterized by a gear housing which includes six vulnerable bolts which are easily accessible. The six bolts attach the out drive to the bell housing of a fitting connected to the transom of a boat. An example of this common out drive connection is seen for example in U.S. Pat. No. 4,325,701 in FIG. 1. For purposes of reducing the amount of pages of this application, the Merc Cruiser out drive will not be described in detail. Suffice it to say that this invention shields the location of the six vulnerable bolts as described more fully hereinafter.

With further reference to U.S. Pat. No. 4,325,701, it provides a shield for the six bolts; however, the cap of the gear housing of the drive must be replaced in order to provide a different cap according to the patent, which has an eye structure to accommodate a padlock. It is not desirable that an out drive be modified in such a way because it violates the warranty of the manufacturer. This invention is of a device which attaches in a non-intrusive attachment manner about a Merc Cruiser out drive Alpha One Series. This invention does not require foreign parts to replace existing structure or parts of a standard Merc Cruiser out drive of the Alpha One Series. Rather, this invention, when installed, provides a protective shield, which is preferably of steel, and which can be installed without the need of tools which presents what appears to be a massive defense to deter theft of an out drive and is effective to thwart a "quick snatch" thief.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DESCRIPTION OF THE PREFERRED EMBODIMENT

Figure 1:
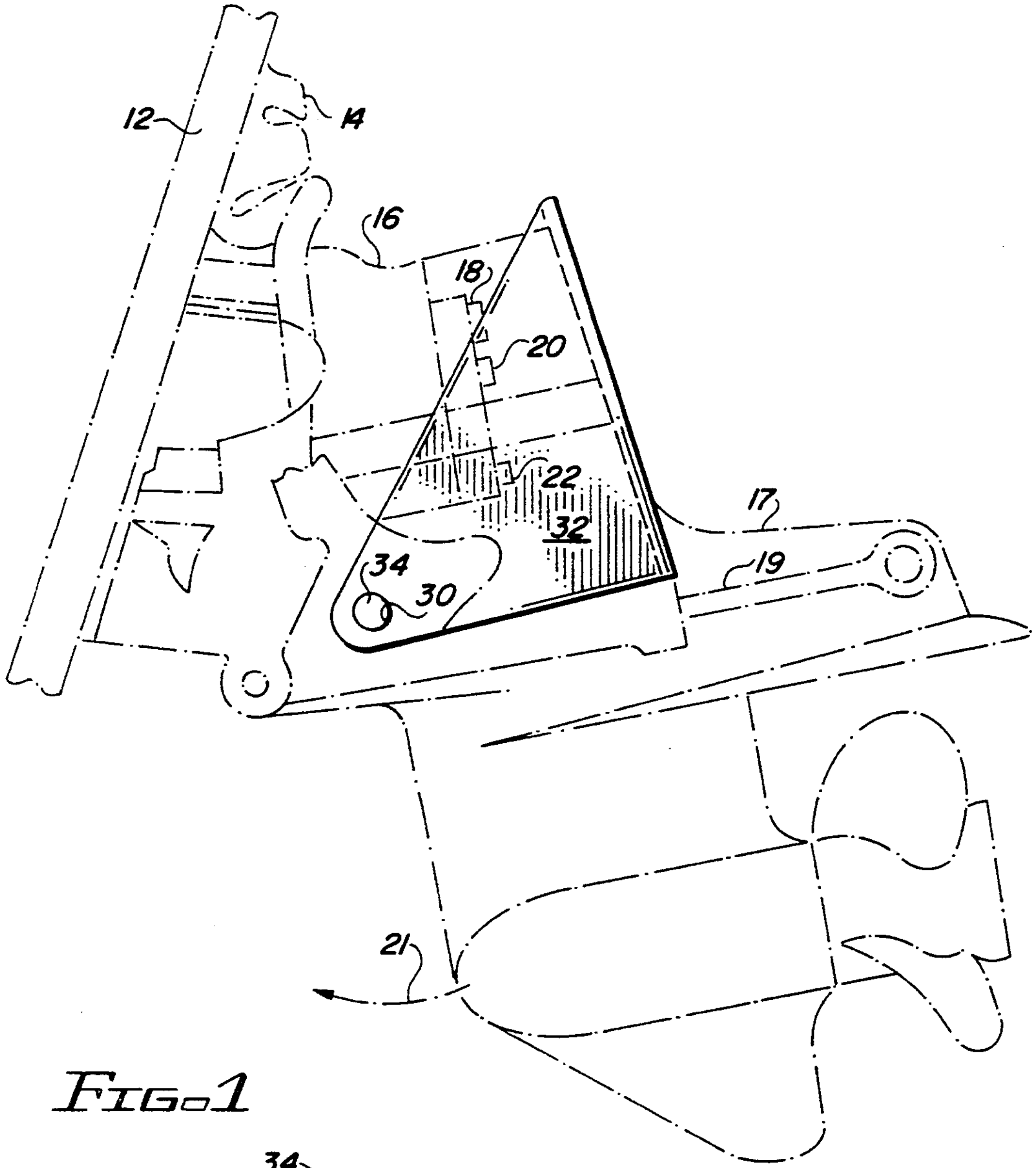
FIG. 1 is a side elevation view of the protective shield installed about an out drive and which is shown in dashed lines.

Before describing the protective shield 32 in detail, it is pointed out, on reference to FIG. 1, that the out drive there indicated has been elevated, that is to say it is not in the operative or down position. Only when in the elevated or up position indicated in FIG. 1, it is important to note that there is a space 30 which is created and which space is utilized for passage of a locking pin 34 which connects the shield in protective relation about the out drive housing denying access to the vulnerable bolts, such as 18, 20 and 22.

Referring to the drawings, and particularly to FIG. 1, the numeral 12 indicates, generally, the transom of a boat to which there is mounted a fitting 14 which includes a bell housing 16. Conventionally, an out drive generally designated by the numeral 17 is secured to the bell housing by means of six bolts which are designated by the numerals 18, 20, and 22. On the opposite side not shown in FIG. 1 there are similarly three bolts which also secure the out drive to the bell housing.

As will be appreciated by those in the field, in FIG. 1, the out drive is shown in an elevated or raised position. The out drive is raised by operation of pistons, one of which is designated by the numeral 19, there being a companionate piston on the opposite side of the out drive. The out drive may be moved to the in use or operating position by swinging it in the direction of the arrowed line 21, using the piston drive. When the out drive is in the lowered position, not shown, there is no space 30; however, when the out drive is in the raised attitude as shown in FIG. 1, there is a space generally designated by the numeral 30. This space is of significance in connection with the protective shield and its installation now to be described.

The protective shield, generally designated by the numeral 32, is secured by a pin 34 and padlock, not shown in FIG. 1, protectively about the connecting bolts of the out drive in a manner now to be described.

Referring first to the protective shield, as seen in FIGS. 2–5, it is seen that it includes a rear wall 37 and opposite side walls 39 and 41 which are in spaced relation with respect to one another, the wall 37 being sized and structured to be disposed in close proximity to the aft facing surface of the out drive housing. It will be seen in FIG. 1 that the walls 39 and 41 are of sufficient height at the rear wall 37 to cover at least two of the anchoring bolts on each side of the connection of the out drive to the bell housing, which are bolts 20 and 22 in FIG. 1 and the opposite side bolts, not shown. Preferably, the side walls 39 and 41 are disposed closely about the uppermost bolt 18 also, so as to interfere with ready manipulation of removal.

Figure 5:
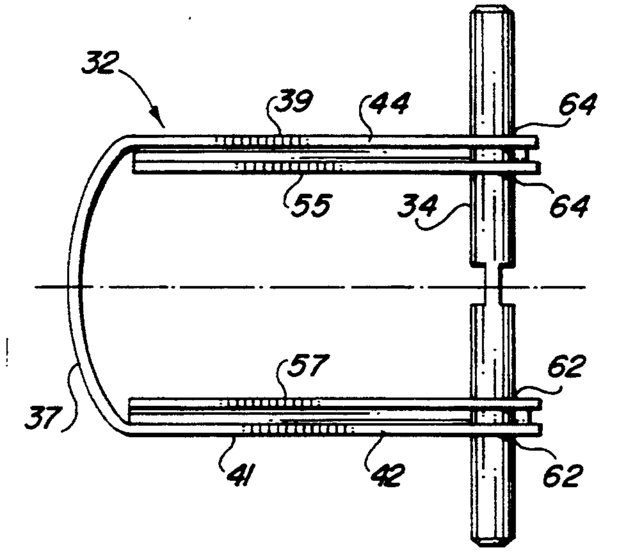
FIG. 5 is a top plan view of the protective shield.
Figure 3:
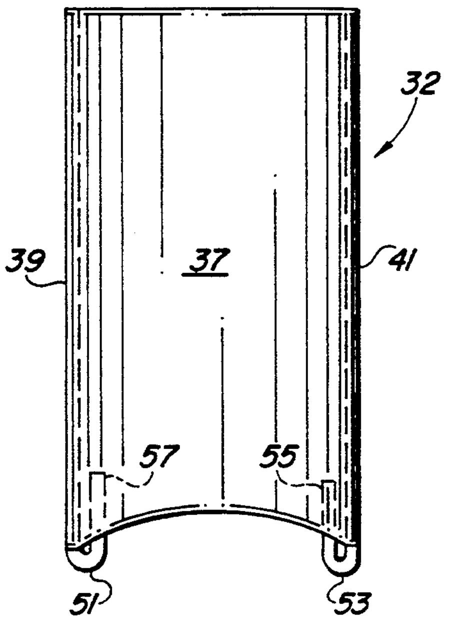
FIG. 3 is a rear elevation view of the shield, that is, looking from the stern forward toward the vessel when installed.
Figure 2:
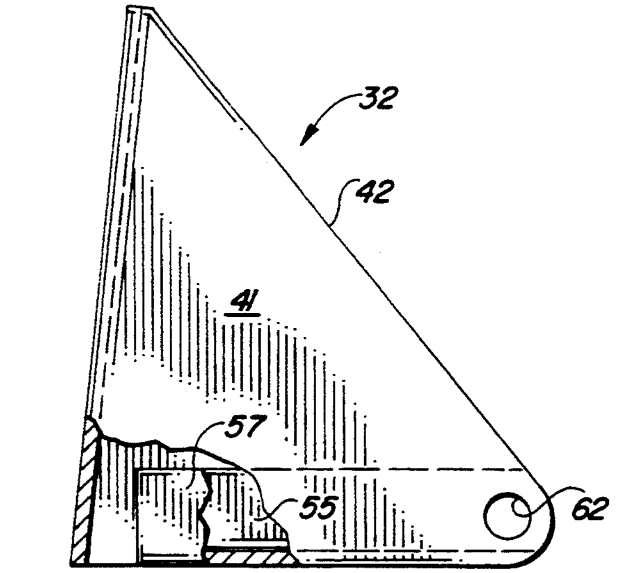
FIG. 2 is a side elevation view of the protective shield; the opposite side elevation view is a mirror image of this view.
Figure 4:
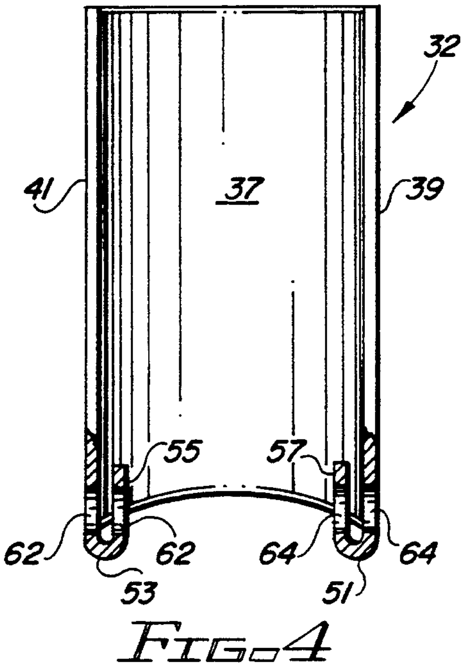
FIG. 4 is a front elevation view, that is, looking at the protective shield from inside the vessel aft.

Thus, in the preferred embodiment of the shield, the top edge of the side walls, edges 42 and 44, see FIG. 5, converge from the rear wall 37 downwardly to the bottom edge of each of the side walls, the bottom edges being designated by the numerals 51 and 53, see FIG. 4. In the preferred embodiment, as seen best in FIGS. 3 and 4, the lower portion of the side walls is reversely bent in a U-shaped formation providing upwardly extending inner legs 55 and 57 for a purpose to be described. It is pointed out that the width of the drive at this lower location is somewhat narrower than in the upper zone.

Figure 6:
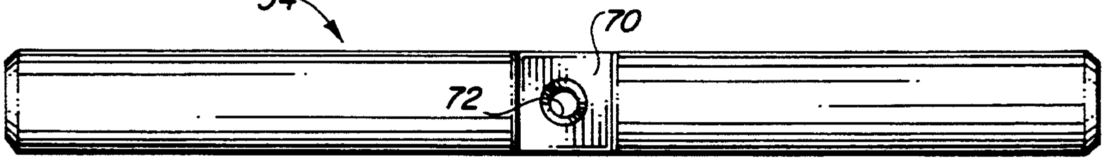
FIG. 6 is a top plan view of a locking pin used in connection with the shield for securing it about the out drive, as described more fully hereinafter.
Figure 7:
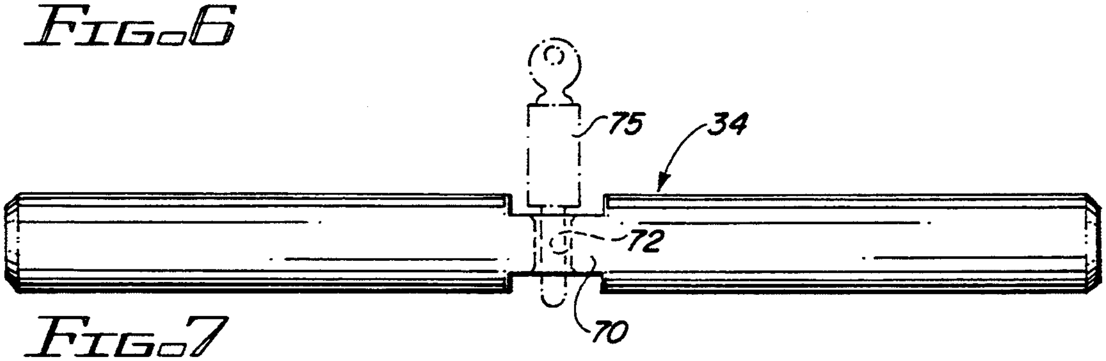
FIG. 7 is a side elevation view illustrating the protective pin with a padlock secured to it.

For the purpose of securing the protective shield in covering relation of the out drive, as seen in FIG. 1, a locking pin, shown in FIGS. 6 and 7 and designated by the numeral 34, is provided. The locking pin is sized and configured for passage through the space 30 and through the aligned holes in the lower portion of the side walls 39 and 41 and legs 55 and 57 adjacent the lower edges, generally the holes are designated by the numerals 62 and 64. The locking pin is of steel, as is the shield proper, in the preferred embodiment.

Referring more particularly to FIGS. 6 and 7, in one preferred embodiment, the pin 34 has a central portion 70 which is of reduced diameter and through the center of which there is provided a hole 72. Once the pin is inserted so as to pass through the space 30 and the holes 62 and 64, it is of a length such that it extends outwardly from each hole. A padlock designated by the numeral 75 is secured to keep the pin in position, the locked position described. It will be appreciated that the length of the pin is about twice the length of the span between the inside confronting surfaces about the holes of the respective side walls so that upon shifting of the pin in one direction or the other, it cannot not be removed from the holes because the padlock will come in abutting contact with the shield walls serving as a stop against this shifting movement of removal. Also, because of the location of the padlock in the space 30 which is rather confined, the lock is substantially hidden and when discovered, is not readily accessible for tools which might be used in an attempt to break the lock and remove the pin and shield.

In operation, when the boat is not in use, the out drive is elevated to the position in FIG. 1, causing the space 30 to appear. At this point, the shield is fitted over the out drive housing in covering relation preferably of at least four of the bolts securing the out drive to the bell housing, as indicated in FIG. 1. It will be seen that the upper edge of the shield is closely adjacent the uppermost exposed bolts so that they cannot be easily manipulated. Thereafter, the pin 34 is inserted through the holes 62 and 64 of the side walls 39 and 41 and lower legs 55 and 57 and through the confined space 30 created which appears when the out drive is raised. Thereafter, a padlock 75 is secured through the hole 72 in the locking pin. It will be appreciated that various modifications can be made of the pin structure itself. For example, a pair of oppositely extending sleeves might be provided on the pin, which is not shown but which it is apparent would prevent shifting and accommodate a pin of reduced length.

In a preferred embodiment, the side walls are spaced so as to define an outer dimension of about 6-½" and a distance between the leg surfaces is about 5-½". The overall height of the shield is about 12". Preferably, the locking pin is of steel rod of 1" diameter and the walls are ¼" thick steel, it being noted that the legs 55 and 57 provide reinforcement.

While this invention has been shown and described in a practical and preferred embodiment, it is recognized that departures may be made within the spirit and scope of this invention which, therefore, should not be limited except as set forth in the claims which follow and within the doctrine of equivalents.

Now that the invention has been described,

What is claimed is:

1. For use with a vessel having an inboard engine, transmission means operatively connected with the engine and having a portion which extends exteriorly of the vessel, and an out drive having a housing with a propeller rotatably mounted to the housing, said out drive being swingable between an operative lowered position of the propeller and an elevated position wherein a narrow longitudinal through channel is defined between the out drive and said exteriorly extending portion of the transmission, said out drive housing having a mounting flange which registers with a mounting flange on the exteriorly extending portion of the transmission, said out drive being secured to said transmission means by removable fasteners extending through one of said mounting flanges and into the other mounting flange, a protective shield to deter unauthorized removal of the out drive from the transmission means when the out drive is in an elevated position and effective to block access to said fasteners, said shield comprising, a pair of spaced side walls and a rear wall spanning the side walls, said walls being sized, adapted and configured to be disposed in close adjacent embracing relation relative to said fasteners and out drive housing to obstruct access to the fasteners, said side walls each having an upper edge and a lower edge and said upper edge of each of said side [wall-]walls converging downwardly and away from said rear wall to the lower edge, each of said side walls having a hole therethrough adjacent the juncture of the converging upper edge and lower edge of each side wall and said holes being aligned, a locking pin configured and dimensioned to extend through said narrow channel, said locking pin being sized to be received in the holes in spanning relation of [the]said side walls, and locking means adapted to extend through the locking pin to block removal of the locking pin when said protective shield is positioned about said out drive and fasteners.

2. The protective shield as set forth in claim 1 wherein each of said side walls includes an inner upwardly extending reinforcing portion adjacent its lower edge.

3. The protective shield as set forth in claim 1 wherein said locking pin has a first end and a second end and is provided with a hole centrally located between the ends to receive a padlock.

4. The protective shield as set forth in claim 1 wherein the locking pin between ends is at least twice the length of the distance between the side walls of the protective shield.

5. The protective shield as set forth in claim 3 wherein the pin has a central zone about the hole and said central zone is of reduced thickness.

6. The protective shield as set forth in claim 1 wherein said walls and pin are of steel material.

* * * * *